United States Patent
Matsuo et al.

(10) Patent No.: US 10,065,648 B2
(45) Date of Patent: Sep. 4, 2018

(54) VEHICLE CONTROL SYSTEM AND VEHICLE CONTROL METHOD

(71) Applicant: TOYOTA JIDOSHA KABUSHIKI KAISHA, Toyota-shi, Aichi (JP)

(72) Inventors: Kenji Matsuo, Toyota (JP); Yusuke Ohgata, Toyota (JP); Daisuke Inoue, Toyota (JP); Atsushi Ayabe, Toyota (JP); Motonori Kimura, Toyota (JP); Shuhei Ishikawa, Toyota (JP); Akira Hino, Toyota (JP); Hiroki Kondo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 416 days.

(21) Appl. No.: 14/782,452

(22) PCT Filed: Apr. 4, 2013

(86) PCT No.: PCT/JP2013/060346
§ 371 (c)(1),
(2) Date: Oct. 5, 2015

(87) PCT Pub. No.: WO2014/162563
PCT Pub. Date: Oct. 9, 2014

(65) Prior Publication Data
US 2016/0052522 A1   Feb. 25, 2016

(51) Int. Cl.
*B60W 30/19* (2012.01)
*F16H 61/04* (2006.01)
(Continued)

(52) U.S. Cl.
CPC ............. *B60W 30/19* (2013.01); *B60K 17/00* (2013.01); *B60W 10/02* (2013.01);
(Continued)

(58) Field of Classification Search
CPC .... B60W 30/19; B60W 10/02; B60W 10/107; B60W 17/00; F16H 37/021; F16H 37/46; B60K 17/00
(Continued)

(56) References Cited

U.S. PATENT DOCUMENTS 5,021,031 A    6/1991   Hibi

FOREIGN PATENT DOCUMENTS

EP    0 386 746 A1 *   9/1990
EP    0 410 448 A2 *   1/1991
(Continued)

*Primary Examiner* — William C Joyce
(74) *Attorney, Agent, or Firm* — Oliff PLC (57) ABSTRACT

Vehicle control system and method provided to change speed ratio smoothly when switching a power transmission route from a route including a geared transmission to a route including a continuously variable transmission. Vehicle control system applied to a vehicle comprising: continuously variable transmission for changing speed ratio continuously is disposed between input shaft and output shaft; geared transmission is disposed parallel to the continuously variable transmission, and is adapted to establish speed ratio that cannot be established by continuously variable transmission; and friction clutch is brought into engagement to switch torque transmission route from a route including the geared transmission to a route including the continuously variable transmission. Vehicle control system configured to start speed change operation of continuously variable transmission before the friction clutch is brought into engagement completely when switching torque transmission route from the route including the geared transmission to the route including the continuously variable transmission.

12 Claims, 3 Drawing Sheets

(51) Int. Cl.

| | | |
|---|---|---|
| *F16H 61/662* | (2006.01) | |
| *B60K 17/00* | (2006.01) | |
| *B60W 10/02* | (2006.01) | |
| *B60W 10/107* | (2012.01) | |
| *F16H 37/02* | (2006.01) | |
| *F16H 59/14* | (2006.01) | |
| *F16H 59/46* | (2006.01) | |
| *F16H 59/48* | (2006.01) | |
| *F16H 59/68* | (2006.01) | |
| *F16H 61/02* | (2006.01) | |

(52) U.S. Cl.
CPC ......... *B60W 10/107* (2013.01); *F16H 37/021* (2013.01); *F16H 59/14* (2013.01); *F16H 59/46* (2013.01); *F16H 59/48* (2013.01); *F16H 59/68* (2013.01); *F16H 61/0262* (2013.01); *F16H 61/04* (2013.01); *F16H 61/662* (2013.01); *F16H 61/66259* (2013.01); *B60W 2510/1045* (2013.01); *B60W 2710/021* (2013.01); *B60W 2710/1005* (2013.01); *F16H 37/022* (2013.01); *F16H 2037/026* (2013.01); *F16H 2059/683* (2013.01); *F16H 2059/6807* (2013.01)

(58) Field of Classification Search
USPC .......................................................... 74/664
See application file for complete search history.

(56) References Cited

FOREIGN PATENT DOCUMENTS

| | | | |
|---|---|---|---|
| EP | 0 410 451 | A2 * | 1/1991 |
| JP | S63-101561 | A | 5/1988 |
| JP | H02-241844 | A | 9/1990 |
| JP | H03-56762 | A | 3/1991 |
| JP | H03-61762 | A | 3/1991 |
| JP | 2010-138961 | A | 6/2010 |
| JP | 2010-175058 | A | 8/2010 |
| JP | 2011-122671 | A | 6/2011 |
| JP | 2012-245833 | A | 12/2012 |

* cited by examiner

|  | C1 | C2 | C3 | B |
|---|---|---|---|---|
| Start | ON | OFF | ON | OFF |
| Forward | OFF | ON | (ON) | OFF |
| Backward | OFF | OFF | ON | ON |

VEHICLE CONTROL SYSTEM AND VEHICLE CONTROL METHOD

TECHNICAL FIELD

The present invention relates to a control system and a control method for a vehicle in which a geared transmission adapted to establish fixed gear stages and a continuously variable transmission adapted to change a speed ratio continuously are arranged parallel to each other between an input shaft and an output shaft.

BACKGROUND ART

Vehicles in which a geared transmission and a continuously transmission are arranged parallel to each other between an input shaft to which a power of the prime mover is delivered and an output shaft are known in the conventional art. The geared transmission is adapted to select a fixed gear stage from a plurality of gear stages, and the continuously variable transmission is adapted to change a speed ratio continuously. In the vehicle of this kind, a clutch is arranged to switch a power transmission route between a route including the geared transmission and a route including the continuously variable transmission. It is also known in the art that the geared transmission is adapted to establish a fixed gear stage that cannot be established by the continuously variable transmission. Various kinds of control systems and methods for switching the power transmission route in this kind of vehicles have been proposed.

For example, Japanese Patent Laid-Opens Nos. 03-061762 and 63-101561 describe a control system and a control method for the vehicle in which the geared transmission and a continuously variable transmission are arranged parallel to each other between the input shaft and the output shaft. According to the teachings of Japanese Patent Laid-Open No. 03-061762, a speed change operation of the continuously variable transmission is inhibited until completion of a shifting of the power transmission route from the route including the geared transmission to the route including the continuously variable transmission, so as to maintain a speed ratio on the continuously variable transmission to a maximum ratio from a commencement to a completion of the shifting operation. For this reason, the vehicle is allowed to be propelled utilizing a decelerating effect of the maximum speed ratio when the power transmission route to the route including the continuously variable transmission.

According to the teachings of Japanese Patent Laid-Open No. 63-101561, a speed ratio of the continuously variable transmission is adjusted to a target ratio simultaneously with releasing a lockup clutch to disconnect the input shaft from the geared transmission, when shifting the power transmission route from the route including the geared transmission to the route including the continuously variable transmission. In addition, when shifting the power transmission route, a torque transmitting capacity of a starting clutch that is brought into engagement during propelling the vehicle by delivering power through the route including the continuously variable transmission is reduced with an increase in a difference or a ratio between an input speed and an output speed of the starting clutch.

However, according to the teachings of Japanese Patent Laid-Open No. 03-061762, the continuously variable transmission is allowed to change a speed ratio thereof from a point at which the power transmission route is switched. That is, the speed ratio may be changed stepwise before and after the switching operation of the power transmission route. For this reason, a speed change operation may not be performed smoothly. In addition, it may take time to achieve a target speed ratio calculated based on a vehicle speed. On the other hand, according to the teachings of Japanese Patent Laid-Open No. 63-101561, a torque transmitting capacity of the starting clutch is controlled irrespective of a speed ratio of the continuously variable transmission.

Disclosure of the Invention

The present invention has been conceived noting the foregoing technical problem, and it is therefore an object of the present invention is to provide a control system and a control method for vehicles configured to change a speed ratio smoothly when switching a power transmission route from a route including a geared transmission to a route including a continuously variable transmission.

According to one aspect of the present invention, there is provided a vehicle control system that is applied to a vehicle comprising: a continuously variable transmission having a pair of pulleys for changing a speed ratio continuously that is disposed between an input shaft to which torque of a prime mover is applied and an output shaft; a geared transmission that is disposed parallel to the continuously variable transmission, and that is adapted to establish a speed ratio that cannot be established by the continuously variable transmission; and a friction clutch that is brought into engagement to switch a torque transmission route from a route including the geared transmission to a route including the continuously variable transmission. In order to achieve the above-explained objective, according to the present invention, the vehicle control system is configured to start a speed change operation of the continuously variable transmission before the friction clutch is brought into engagement completely when switching the torque transmission route from the route including the geared transmission to the route including the continuously variable transmission.

The vehicle control system may complete an engagement of the friction clutch while changing a speed ratio of the continuously variable transmission continuously.

For example, the vehicle control system may start the speed change operation of the continuously variable transmission when a torque transmitting capacity of the friction clutch is larger than a predetermined value.

Instead, the vehicle control system may also start the speed change operation of the continuously variable transmission when a difference between a rotational speed of the output shaft and a rotational speed of the continuously variable transmission is smaller than a predetermined value.

The friction clutch is provided with a hydraulic actuator, and hence the vehicle control system may also start the speed change operation of the continuously variable transmission when a hydraulic pressure applied to the friction clutch is raised to be higher than a predetermined level.

In addition, the vehicle control system may complete an engagement of the friction clutch while equalizing a change rate of a speed ratio between a rotational speed of the input shaft and a rotational speed of the output shaft with a change rate of a speed ratio of the continuously variable transmission.

The vehicle to which the control system is applied further comprises: a first clutch adapted to connect and disconnect the input shaft to/from the geared transmission; and a second clutch adapted to connect and disconnect the continuously variable transmission to/from the output shaft. The vehicle control system is further configured to bring the first clutch into engagement while bringing the second clutch into disengagement during propelling the vehicle by delivering torque through the route including the geared transmission, to bring the first clutch into disengagement while bringing the second clutch into engagement during propelling the vehicle by delivering torque through the route including the continuously variable transmission, and to start the speed change operation of the continuously variable transmission before the second clutch is brought into engagement completely during switching the torque transmission route.

According to another aspect of the present invention, there is provided a control method for a vehicle comprising: a continuously variable transmission having a pair of pulleys for changing a speed ratio continuously that is disposed between an input shaft to which torque of a prime mover is applied and an output shaft; a geared transmission that is disposed parallel to the continuously variable transmission, and that is adapted to establish a speed ratio that cannot be established by the continuously variable transmission; and a friction clutch that is brought into engagement to switch a torque transmission route from a route including the geared transmission to a route including the continuously variable transmission. In order to achieve the above-explained objective, according to the present invention, the vehicle control method is characterized by starting a speed change operation of the continuously variable transmission while a torque transmitting capacity of the friction clutch is being increased, when switching the torque transmission route from the route including the geared transmission to the route including the continuously variable transmission; and thereafter completing an engagement of the friction clutch.

The control method further comprises completing the engagement of the friction clutch while changing a speed ratio of the continuously variable transmission continuously.

The control method further comprises starting the speed change operation of the continuously variable transmission when a torque transmitting capacity of the friction clutch is larger than a predetermined value.

The control method further comprises starting the speed change operation of the continuously variable transmission when a difference between a rotational speed of the output shaft and a rotational speed of the continuously variable transmission is smaller than a predetermined value.

As described, the friction clutch is provided with a hydraulic actuator, and the control method further comprises starting the speed change operation of the continuously variable transmission when a hydraulic pressure applied to the friction clutch is raised to be higher than a predetermined level.

The control method further comprises completing the engagement of the friction clutch while equalizing a change rate of a speed ratio between a rotational speed of the input shaft and a rotational speed of the output shaft with a change rate of a speed ratio of the continuously variable transmission.

As also described, the friction clutch includes a first clutch adapted to connect and disconnect the input shaft to/from the geared transmission, and a second clutch adapted to connect and disconnect the continuously variable transmission to/from the output shaft. The control method further comprises: bringing the first clutch into engagement while bringing the second clutch into disengagement during propelling the vehicle by delivering torque through the route including the geared transmission; bringing the first clutch into disengagement while bringing the second clutch into engagement during propelling the vehicle by delivering torque through the route including the continuously variable transmission; and starting the speed change operation of the continuously variable transmission before the second clutch is brought into engagement completely during shifting the torque transmission route.

Thus, according to the present invention, the shifting operation of the geared transmission is started before the completion of engagement of the clutch to shift the transmission route from the route including the geared transmission to the route including the continuously variable transmission. Therefore, the speed change operation can be carried out smoothly while reducing an inertia torque. Specifically, torque of the output shaft can be changed smoothly to reduce a shift shock and discomfort during transmitting torque through the friction clutch with a predetermined transmitting capacity to switch the transmission route. The speed change operation can be further smoothened by equalizing a change rate of a speed ratio of the continuously variable transmission with a change rate of a speed ratio between a rotational speed of the input shaft and a rotational speed of the output shaft (i.e., a total speed ratio). Specifically, during switching the transmission route, the engagement of the clutch is started first, and then the shifting operation of the geared transmission is started. Therefore, the total speed ratio can be changed promptly to the target ratio without delay so that speed change response can be improved. In addition, since the shift shock can be reduced without increasing a required time for the clutch-to-clutch shifting, damage of a friction material of the friction clutch can be reduced to elongate lifetime thereof.

DETAILED DESCRIPTION OF THE PREFERRED EMBODIMENT(S)

Preferred example of the present invention will be explained hereinafter. The vehicle control system according to the present invention is applied to a vehicle comprising a continuously variable transmission adapted to change a speed ratio continuously and a geared transmission adapted to select a gear stage from a plurality of fixed stages. In the vehicle, the continuously variable transmission and the geared transmission are arranged parallel to each other between an input shaft to which a power of a prime move is delivered and an output shaft. The vehicle further comprises a clutch device adapted to switch a power transmission route from a route including the continuously variable transmission and a route including the geared transmission. The present invention is configured to actuate the clutch device while activating the continuously variable transmission when switching the power transmission route from the route including the geared transmission to the route including the continuously variable transmission.

Figure 1:
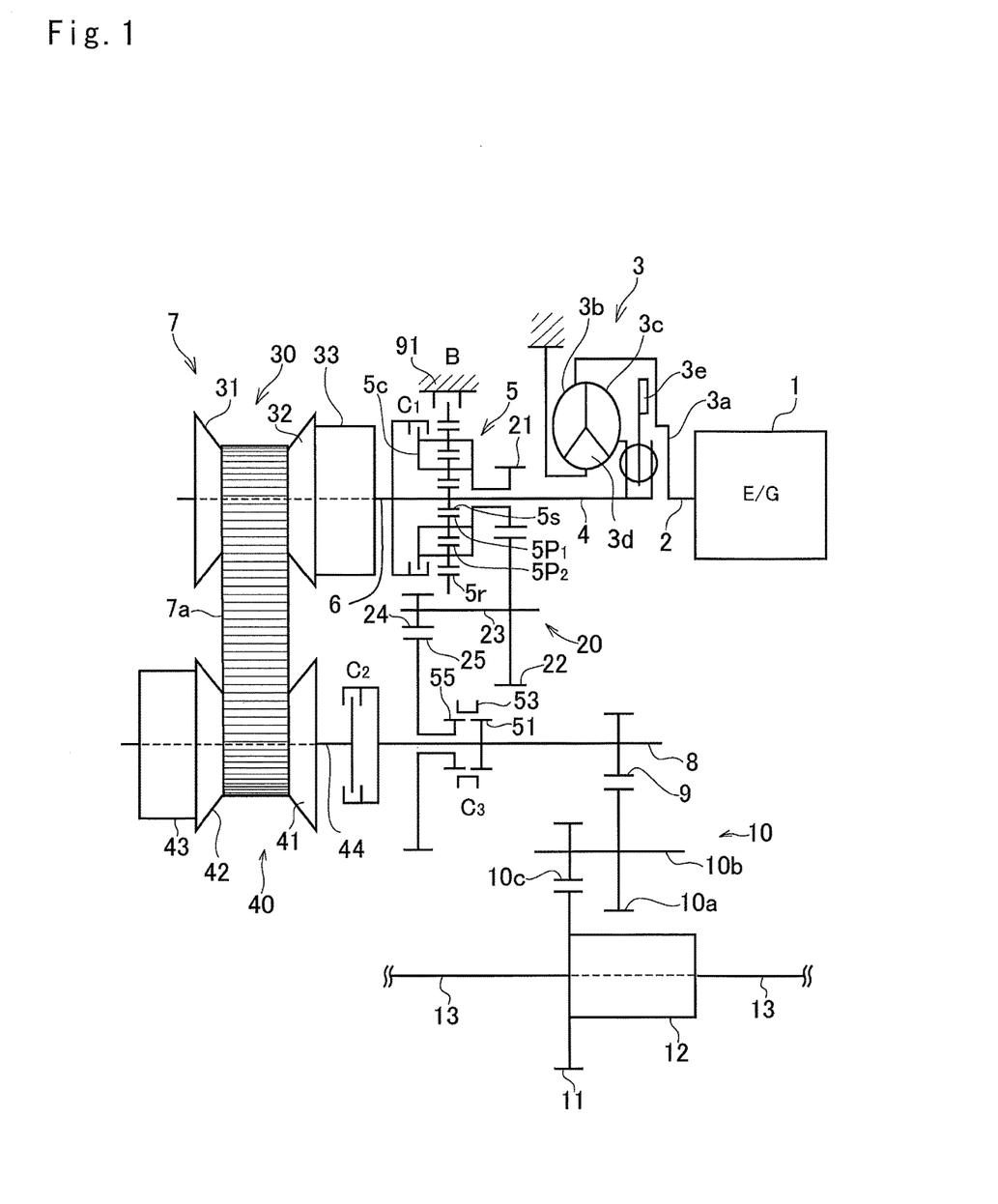
FIG. 1 is a skeleton diagram showing one example of a speed change unit in which the geared transmission and the continuously variable transmission are arranged parallel to each other.

Referring now to FIG. 1, there is shown one example of a power transmission route from a prime mover to drive wheels via a speed change unit to which the present invention is applied. The speed change unit is adapted to change a speed ratio between a rotational speed $N_{in}$ of an input shaft 4 and a rotational speed $N_{out}$ of an output shaft 8, and to this end, the speed change unit comprises a torque reversing device 5, a continuously variable transmission, and a geared transmission 20. According to the preferred example, an internal combustion engine (E/G) such as a gasoline engine is used as a prime mover. In the following description, the prime mover is called as the "engine 1".

A torque converter 3 having a lockup clutch is connected to a crank shaft 2 of the engine 1. The torque converter 3 as a conventional fluid coupling comprises a front cover 3a, a pump impeller 3b integrated with the front cover 3a, a turbine runner 3c opposed to the pump impeller 3b, and a stator 3d mounted on a not shown one-way clutch between the pump impeller 3b and the turbine runner 3c. Specifically, the front cover 3a is connected to the crank shaft 2 so that the front cover 3a and the pump impeller 3b are rotated integrally with the crank shaft 2. The turbine runner 3c is connected to the input shaft 4 to be rotated integrally therewith. That is, the turbine runner 3c is rotated at a same speed $N_t$ as the rotational speed $N_{in}$ of the input shaft 4. In addition, a lockup clutch 3e rotated integrally with the turbine runner 3c is arranged to be opposed to an inner face of the front cover 3a. The lockup clutch 3e is brought into contact to the inner face of the front cover 3a to transmit torque thereto when a pressure from the turbine runner 3c side exceeds a pressure from the front cover 3a side, and withdrawn from the inner face of the front cover 3a to interrupt torque transmission thereto when the pressure from the front cover 3a side exceeds the pressure from the turbine runner 3c side. The aforementioned one-way clutch is disposed between the stator 3d and a fixed member such as a casing.

The torque reversing device 5 is disposed on the input shaft 4. Specifically, the torque reversing device 5 is adapted to transmit torque of the input shaft 4 without reversing a direction to propel the vehicle in the forward direction, and to transmit torque of the input shaft 4 while reversing a direction to propel the vehicle in the backward direction. To this end, a conventional differential mechanism adapted to perform a differential action among three rotary elements is used as the torque reversing device 5. As shown in FIG. 1, according to the preferred example, a double-pinion planetary gear unit is used as the torque reversing device 5.

The torque reversing device 5 comprises a sun gear 5s as an external gear, a ring gear 5r as an internal gear that is arranged concentrically with the sun gear 5s, first pinion gears $5P_1$ individually meshing with the sun gear 5s, second pinion gears $5P_2$ individually meshing with the first pinion gears $5P_1$ and the ring gear 5r, and a carrier 5r supporting the first pinion gears $5P_1$ and the second pinion gears $5P_2$ in such a manner to revolve around the sun gear 5s while rotating. The sun gear 5s is fitted onto the input shaft 4 in such a manner to be rotated integrally therewith to serve as an input element of the planetary gear unit. A rotation of the ring gear 5r is selectively stopped by a brake device B. That is, the ring gear 5r serves as a reaction element of the planetary gear unit. The brake device B is disposed between the ring gear 5r and the fixed member such as the casing, and for example, a multi-plate brake, a friction brake, a dog brake and so on may be used as the brake device B.

The carrier 5c is rotated integrally with a below-mentioned drive gear 21 of the geared transmission 20 to serve as an output element of the planetary gear unit. In order to rotate the planetary gear unit entirely integrally by connecting the carrier 5c with the sun gear 5s, a first clutch device C1 is disposed between the carrier 5c and the sun gear 5s. Specifically, the first clutch device C1 is adapted to connect at least two rotary elements of the three rotary elements to rotate the planetary gear unit integrally. The first clutch device C1 is further adapted to deliver the torque of the input shaft 4 directly to the carrier 5c as the output element. That is, the first clutch device C1 is disposed to selectively enable and disable torque transmission between the input shaft 4 and the geared transmission 20. According to the preferred example, a wet-type or dry-type friction clutch whose torque transmitting capacity is changed according to an engagement pressure is used as the first clutch device C1. The first clutch device C1 is provided with a hydraulic actuator connected to a not shown hydraulic circuit so that the first clutch device C1 is actuated by changing a hydraulic pressure $P_{C1}$ in the hydraulic actuator. That is, torque transmitting capacity of the first clutch device C1 is changed by changing hydraulic pressure (i.e., engagement pressure) $P_{C1}$ applied thereto.

The planetary gear unit employed as the torque reversing device 5 can be explained in the form of nomographic diagram. In the nomographic diagram, three vertical lines drawn parallel to one another represent the sun gear 5s, the ring gear 5s and the carrier 5c respectively. Specifically, the line representing the sun gear 5s and the line representing the carrier 5c are situated both sides, and the line representing the ring gear 5r as the reaction element is situated in the middle. Provided that a clearance between the lines representing the sun gear 5s and the carrier 5c is "1", a clearance between the lines representing the ring gear 5r and the carrier 5s is determined based on a gear ratio between the sun gear 5s and the ring gear 5r. A horizontal base line represents a fact that a rotational speed of those rotary elements are zero, and rotational speeds of the rotary elements are indicated as vertical levels on the vertical lines. For example, in case the first clutch device is brought into engagement so that the torque reversing device 5 is rotated integrally, the rotational speeds of the rotary elements are rotated at same speeds in the forward direction. In this case, the rotational speeds of those rotary elements are indicated by a horizontal flat line. By contrast, in case the ring gear 5r is halted by the brake device B, the sun gear 5s is rotated in the forward direction, the ring gear 5r is stopped, and the carrier 5c is rotated in the counter direction. That is, the carrier 5c is rotated in the direction opposite to the rotational direction of the sun gear 5s. In this case, the rotational speeds of those rotary elements are indicated by a diagonal line.

The input shaft 4 and the output shaft 8 are arranged parallel to each other. In the vehicle to which the present invention is applied, a transmission route including a continuously variable transmission 7 adapted to change a speed ratio continuously and a transmission route including the geared transmission 20 adapted to establish a fixed gear stage are arranged parallel to each other. In the following description, a speed ratio of the continuously variable transmission 7 will be called the variable ratio $\gamma_1$, and a gear ratio of the geared transmission 20 will be called the fixed ratio $\gamma_2$.

A conventional belt-driven continuously variable transmission is used as the continuously variable transmission 7. Specifically, the continuously variable transmission 7 comprises a primary shaft 6 and a secondary shaft 44 arranged parallel to each other, a primary pulley 30 as a drive member rotated integrally with the primary shaft 6, a secondary pulley 40 as a driven member rotated integrally with the secondary shaft 44, and a belt 7a running on those pulleys 30 and 40. An effective running diameter of the belt 7a in each pulley 30, 40 is changed by changing a width of a belt groove on the pulley. That is, the variable ratio $\gamma_1$ can be changed continuously and steplessly by changing a belt groove of the pulley.

The primary pulley 30 is situated on the other side of the engine 1 in the axial direction across the torque reversing device 5, and rotated integrally with the primary shaft 6 extending coaxially with the input shaft 4. According to the preferred example, the primary shaft 6 and the input shaft 4 are rotated integrally, that is, the primary shaft 6 is rotated integrally with the sun gear 5s of the torque reversing device 5. The primary pulley 30 comprises a fixed sheave 31 integrated with the primary shaft 6, and a movable sheave 32 fitted onto the primary shaft 6 while being allowed to reciprocate toward and away from the fixed sheave 31. In addition, the movable sheave 32 is provided with an actuator 33 for applying a thrust force to move the movable sheave 32 toward the fixed sheave 31. Specifically, the actuator 33 is attached to a back side of the movable sheave 32, that is, to the opposite side of the fixed sheave 31. Both an electric actuator and a hydraulic actuator may be used as the actuator 33 to push the movable sheave 32 in the axial direction. Since the primary shaft 6 is thus connected to the input shaft 4 to be rotated integrally therewith in the preferred example, the primary shaft 4 will also be called the input shaft 4 in the following description.

The secondary pulley 40 is arranged in such a manner that a rotational center axis thereof extends parallel to that of the primary pulley 30. The secondary pulley 40 comprises a fixed sheave 41 integrated with the secondary shaft 44, and a movable sheave 42 fitted onto the secondary shaft 44 while being allowed to reciprocate toward and away from the fixed sheave 41. In addition, the movable sheave 42 is provided with an actuator 43 for applying a thrust force to move the movable sheave 42 toward the fixed sheave 41. Specifically, the actuator 43 is attached to a back side of the movable sheave 42, that is, to the opposite side of the fixed sheave 41. Both an electric actuator and a hydraulic actuator may also be used as the actuator 43 to push the movable sheave 42 in the axial direction.

A second clutch device C2 is disposed between the secondary pulley 40 and the output shaft 8 to selectively connect the secondary shaft 44 to the output shaft 8. The second clutch device C2 is adapted to deliver torque of the secondary shaft 44 directly to the output shaft 8. That is, the second clutch device C2 selectively enables torque transmission between the continuously variable transmission 7 and the output shaft 8. According to the preferred example, a wet-type or dry-type friction clutch whose torque transmitting capacity is changed according to an engagement pressure may also be used as the second clutch device C2. The second clutch device C2 is also provided with a hydraulic actuator connected to a not shown hydraulic circuit so that the second clutch device C2 is actuated by changing a hydraulic pressure $P_{C1}$ in the hydraulic actuator. That is, torque transmitting capacity of the second clutch device C2 is changed by changing hydraulic pressure (i.e., engagement pressure) $P_{C2}$ applied thereto. Optionally, the hydraulic actuator of the second clutch device C2 may be connected to a not shown accumulator.

Here will be explained the geared transmission 20 adapted to shift a gear stage among a plurality of fixed stages. The geared transmission 20 may serve not only as a speed reducing device establishing the fixed ratio $\gamma_2$ that is larger than the maximum ratio $\gamma_{1max}$ of the continuously variable transmission 7, but also as a speed increasing device establishing the fixed ratio $\gamma_2$ that is smaller than the minimum ratio $\gamma_{1min}$ of the continuously variable transmission 7. As shown in FIG. 1, according to the preferred example, the geared transmission 20 is adapted to serve as the speed reducing device. To this end, a counter shaft 23 is disposed between the input shaft 4 and the output shaft 8 to rotate a drive gear 21 of drive side and a driven gear 25 of driven side in a same direction. Specifically, the drive gear 21 is connected to the carrier 5c as the output member of the torque reversing device 5 while being meshed with a counter driven gear 22 that is diametrically larger than the drive gear 21. Thus, the drive gear 21 and the counter driven gear 22 form a first gear pair. Number of teeth of the counter driven gear 22 is larger than that of the drive gear 21 so that the torque is delivered from the drive gear 21 to the counter driven gear 22 while reducing a rotational speed.

A counter drive gear 24 that is diametrically smaller than the counter driven gear 22 is meshed with a driven gear 25 to form a second gear pair. The counter drive gear 24 is also diametrically smaller than the driven gear 25. That is, number of teeth of the counter drive gear 24 is smaller than that of the driven gear 25 so that the torque is delivered from the counter drive gear 24 to the driven gear 25 while reducing a rotational speed. The driven gear 25 is fitted onto the output shaft 8 while being allowed to rotate relatively therewith, and the driven gear 25 is connected to the output shaft 8 by a below-mentioned third clutch device C3 to be rotated integrally therewith. Thus, in the geared transmission 20, the drive gear 21 and the output shaft 8 are rotated in a same direction. Accordingly, the fixed ratio $\gamma_2$ of the geared transmission 20 is determined by multiplying a speed ratio (i.e., a gear ratio $i_1$) between the drive gear 21 and the counter driven gear 22 by a speed ratio (i.e., a gear ratio $i_2$) between the counter drive gear 24 and the driven gear 25. As described, the fixed ratio $\gamma_2$ of the geared transmission 20 thus determined is larger than the maximum ratio $\gamma_{1max}$ of the continuously variable transmission 7.

The third clutch device C3 is disposed between the driven gear 25 and the output shaft 8 to selectively provide a connection therebetween. That is, the third clutch device C3 selectively enables torque transmission between the geared transmission 20 and the output shaft 8. Thus in the transmission route including the geared transmission 20, the first clutch device C1 is disposed on the input shaft 4, and the third clutch device C3 is disposed on the output shaft 8. As described, the friction clutch is used as the first clutch device C1 and hence it is unnecessary to change a torque gradually from 0% to 100%. Therefore, a dog clutch such as a synchromesh adapted to be brought into engagement without slip is used as the third clutch device C3.

The third clutch device C3 shown in FIG. 1 is a synchronizer adapted to frictionally synchronize a rotational speed of the output shaft 8 to that of the driven gear 25. To this end, a sleeve 53 of the third clutch device C3 is axially reciprocated by a not shown electrically controlled actuator. Specifically, the driven gear 25 is connected to the output shaft 8 by engaging a spline formed on an inner face of the sleeve 53 of the third clutch device C3 to both splines of a clutch gear 55 rotated integrally with the driven gear 25 and a hub 51 rotated integrally with the output shaft 8.

The speed change unit shown in FIG. 1 is applied to a front-engine front-wheel drive layout vehicle in which a torque is delivered from the output shaft 8 to a front differential unit 12 as a final reduction through a reduction gear unit 10. Specifically, an output gear 9 is fitted onto the output shaft 8, and a large-diameter gear 10 fitted onto a reduction gear shaft 10b is meshed with the output gear 9. A diametrically-small gear 10c is also fitted onto the reduction gear shaft 10b to be meshed with a ring gear 11 of the front differential unit 12. The torque delivered to the front differential unit 12 via the ring gear 11 is distributed to both drive wheels through each drive shaft 13.

An engagement action of each clutch device C1, C2 and C3, and a speed change operation of the continuously variable transmission 7 are controlled by a not shown electronic control unit (ECU) as a controller. The electronic control unit is a microcomputer comprised of a central processing unit (CPU), memory devices (RAM and ROM), and an input-output interface. Various signals from not shown sensors are sent to the electronic control unit. For example, detection signals of a speed $N_e$ of the engine 1, a speed $N_t$ of the turbine runner 3c, a speed $N_{in}$ of the input shaft 4, a speed of the primary shaft 6, a groove width of the primary pulley 30, a groove width of the secondary pulley 40, a speed of the secondary shaft 44, a speed $N_{out}$ of the output shaft 8, a speed of the drive shaft 13, a speed of the drive wheel, a pressure $P_{C1}$ applied to the first clutch device C1, a pressure $P_{C2}$ applied to the second clutch device C2, an opening degree Acc of an accelerator, a depression of a brake pedal, a vehicle speed V of the vehicle and so on are sent to the electronic control unit. In addition, various kinds of control programs and data are preinstalled to the electronic control unit, and the electronic control unit carries out various kinds of calculations based on the preinstalled programs and data and incident signals. Calculation results are transmitted from the electronic control unit in the form of command signals to carry out the controls.

According to the preferred example, specifically, the electronic control unit calculates a required drive force based on an opening degree Acc of the accelerator and a vehicle speed V, and controls the vehicle to achieve the calculated required drive force. In addition, the electronic control unit switches the transmission route between the route including the geared transmission 20 and the route including the continuously variable transmission 7, and executes a speed change operation of the continuously variable transmission 7 based on the opening degree Acc of the accelerator and the vehicle speed V. Specifically, the electronic control unit transmits command signals for actuating the clutch devices C1, C2 and C3 to switch the transmission route from the route including the geared transmission 20 to the route including the continuously variable transmission, or from the route including the continuously variable transmission 7 to the route including the geared transmission 20.

Figure 3:
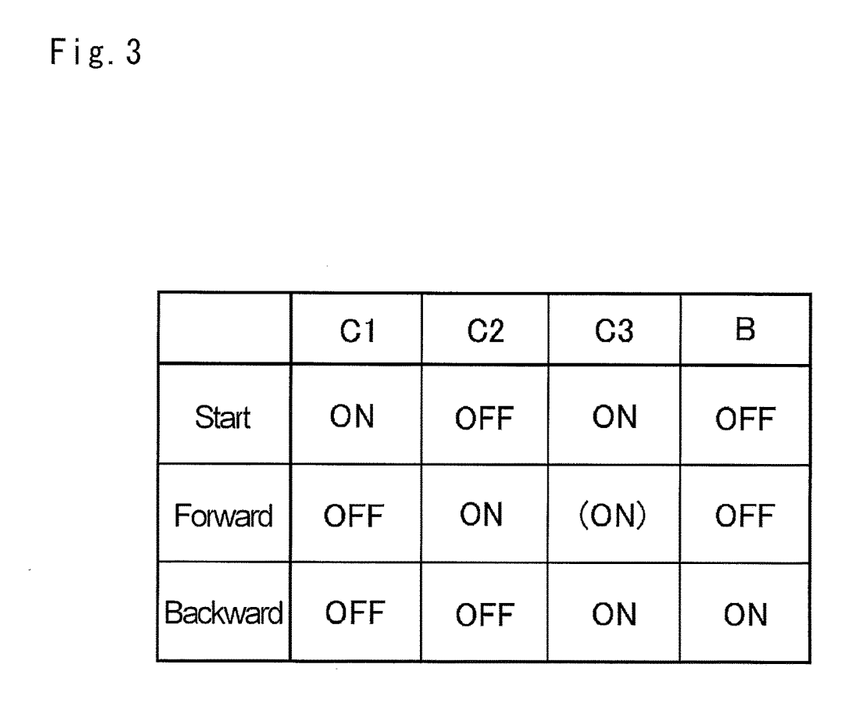
FIG. 3 is a table showing engagement states of the clutch devices and the brake device under each running condition.

For example, the torque is delivered from the input shaft 4 to the output shaft 8 via the route including the geared transmission 20 when the vehicle is started in the forward direction or propelled in the backward direction. By contrast, when the speed of the vehicle propelled in the forward direction is raised to a certain level, the torque is delivered from the input shaft 4 to the output shaft 8 via the route including the continuously variable transmission 7. Turning to FIG. 3, there is shown a table indicating engagement states of the clutch devices C1, C2 and C3, and the brake device B1 under each running condition of the vehicle. In FIG. 3, "ON" represents an engagement of the engagement device, and "OFF" represents a disengagement of the engagement device, and "(ON)" represents a transitional engagement of the engagement device.

When a relatively large drive force is required, for example, when starting the vehicle in the forward direction, the vehicle is propelled under a first mode in which the torque is delivered from the input shaft 4 to the output shaft 8 via the route including the geared transmission 20. In order to establish the first mode, the first clutch device C1 and the third clutch device C3 are brought into engagement, and the second clutch device C2 and the brake device B are brought into disengagement. Consequently, torque of the engine 1 is delivered to the sun gear 5s of the torque reversing device 5 through the input shaft 4, and further delivered from the input shaft 4 to the carrier 5c through the first clutch device C1 in engagement. In this situation, two rotary elements of the torque reversing device 5 as a planetary gear unit are connected by the first clutch C1 so that the torque reversing device 5 is rotated entirely integrally to transmit the torque of the input shaft 4 from the carrier 5c as the output element to the drive gear 21 of the geared transmission 20 without increasing and decreasing a speed.

Meanwhile, the driven gear 25 of the geared transmission 20 is connected to the output shaft 8 by the third clutch device C3 so that the torque of the engine 1 can be delivered from the input shaft 4 to the output shaft 8 through the geared transmission 20. In this situation, the geared transmission 20 reduces the rotational speed, that is, multiplies the transmission torque, and the torque thus multiplied is delivered to the output shaft 8 to rotate the output shaft 8 in the forward direction. In this case, a total speed ratio $\gamma_4$ of the speed change unit between the speed $N_{in}$ of the input shaft 4 and the speed $N_{out}$ of the output shaft 8 can be calculated by multiplying the fixed ratio $\gamma_2$ of the geared transmission 20 by a ratio $\gamma_3$ of the torque reversing device 5 as the planetary gear unit. As described, according to the preferred example, the fixed ratio $\gamma_2$ of the geared transmission 20 is larger than the maximum variable ratio $\gamma_{1max}$ of the continuously variable transmission 7. Thus, when starting the vehicle in the forward direction, the torque reversing device 5 is rotated entirely integrally, and hence the total speed ratio $\gamma_4$ is expressed as the fixed ratio $\gamma_2$ of the geared transmission 20 that is larger than the maximum variable ratio $\gamma_{1max}$ of the continuously variable transmission 7. In this case, the torque of the output shaft 8 is delivered to both drive wheels through the output gear 9, the reduction gear unit 10 and the front differential unit 12 while being multiplied to start the vehicle.

According to the preferred example, the continuously variable transmission 7 is always connected to the input shaft 4 and the sun gear 5s through the primary shaft 6 even during delivering the torque through the route including the geared transmission 20. In this situation, the torque of the engine 1 is delivered to the pulleys 30 and 40 of the continuously variable transmission 7. However, when starting the vehicle, the second clutch device C2 is brought into disengagement to interrupt torque transmission between the secondary shaft 44 and the output shaft 8. That is, while the torque is delivered through the route including the geared transmission 20, the torque is not transmitted from the input shaft 4 to the output shaft 8 through the continuously variable transmission 7 and hence an occurrence of an interlocking of the speed change unit can be prevented.

When the vehicle speed V is raised to a predetermined level after starting the vehicle in the forward direction, the running mode of the vehicle is switched from the first mode in which the torque is delivered from the input shaft 4 to the output shaft 8 through the route including the geared transmission 20 to a second mode in which the torque is delivered from the input shaft 4 to the output shaft 8 through the route including the continuously variable transmission 7. In this situation, the running mode of the vehicle is switched from the first mode to the second mode by a clutch-to-clutch shifting from the first clutch device C1 to the second clutch device C2. Specifically, the torque transmission route from the input shaft 4 to the output shaft 8 is switched from the route including the geared transmission 20 to the route including the continuously variable transmission 7 by bringing the first clutch device C1 in engagement into disengagement while bringing the second clutch device C2 in disengagement into engagement. As described, since the fixed ratio $\gamma_2$ of the geared transmission 20 is larger than the maximum variable ratio $\gamma_{1max}$ of the continuously variable transmission 7, the total speed ratio $\gamma_4$ or the driving force will be changed as a result of switching the torque transmission route from the route including the geared transmission 20 to the route including the continuously variable transmission 7. In order to suppress a shift shock and to prevent discomfort by changing the torque of the output shaft 8 smoothly, the first clutch device C1 is brought into disengagement while causing a slip, and the second clutch device C2 is brought into engagement while causing a slip. That is, a torque transmitting capacity of the second clutch device C2 is increased gradually by increasing an engagement pressure thereof gradually, and a torque transmitting capacity of the first clutch device C1 is reduced gradually by reducing an engagement pressure thereof gradually. Thus, the torque transmission route is shifted from the route including the geared transmission 20 to the route including the continuously variable transmission 7 by the known clutch-to-clutch shifting from the first clutch C1 to the second clutch device C2.

Here will be explained the switching control of the transmission route carried out by the electronic control unit and vehicle behaviors during the switching control with reference to FIG. 2. In the vehicle before carrying out the switching control, that is, before point t1 shown in FIG. 2, the maximum variable ratio $\gamma_{1max}$ is set in the continuously variable transmission 7, and the total speed ratio $\gamma_4$ of the speed change unit is larger than the maximum variable ratio $\gamma_{1max}$. In this situation, the engagement pressure $P_{C1}$ applied to the first clutch device C1 is raised to a level to bring the first clutch device C1 into engaged completely, and the engagement pressure $P_{C2}$ to the second clutch device C2 is reduced to zero so that the second clutch device C2 is brought into disengagement completely. Consequently, the secondary pulley 40 is rotated relatively with the output shaft 8 at a speed $N_{p2}$ that is higher than a rotational speed $N_{out}$ of the output shaft 8.

Figure 2:
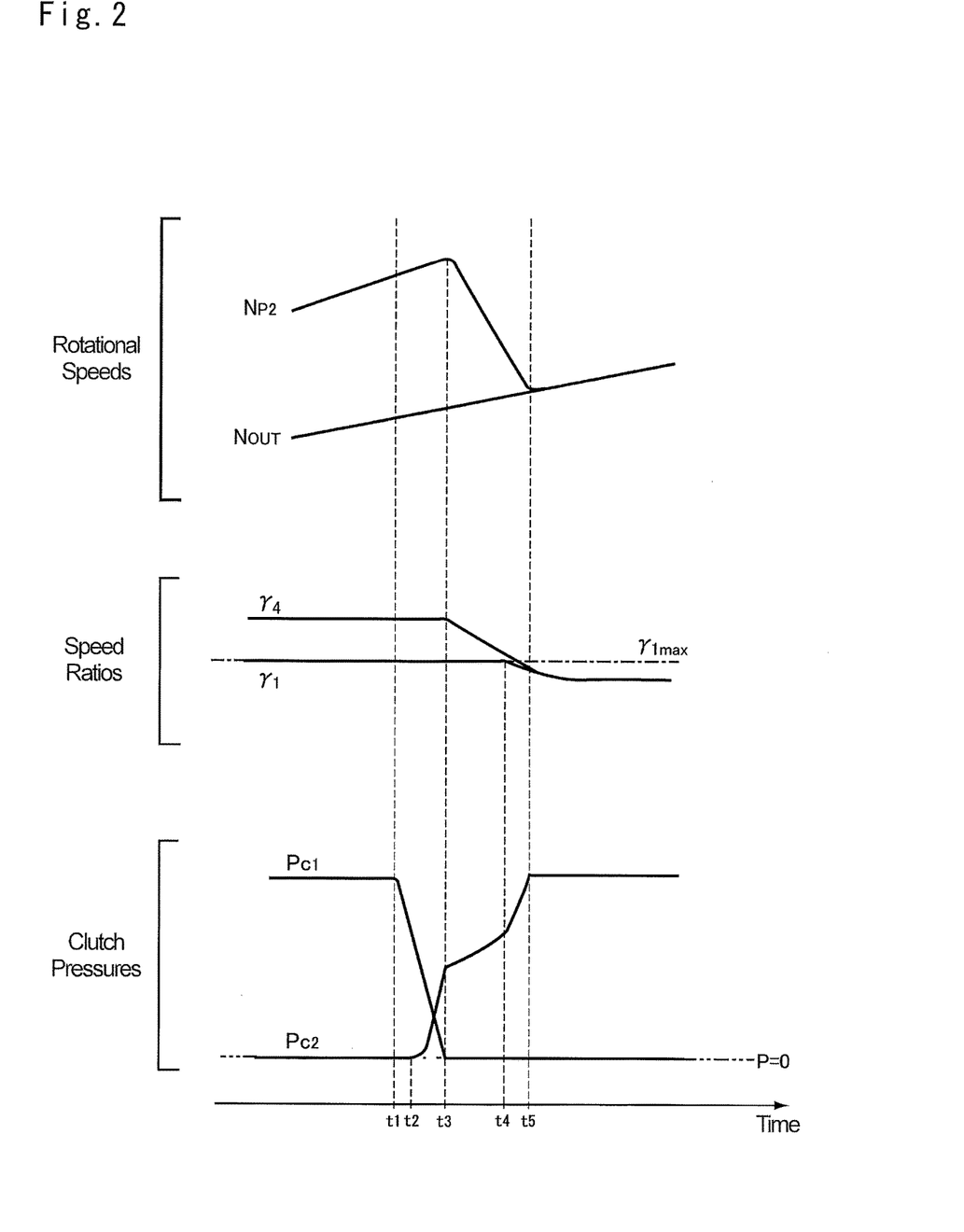
FIG. 2 is a time chart showing changes in vehicle behavior during switching the power transmission route from the route including the geared transmission to the route including the continuously variable transmission.

Specifically, FIG. 2 shows a situation in which the switching control of the transmission route is carried out during upshifting for increasing a rotational speed of the output shaft 8. The electronic control unit is configured to transmit a command signal for switching the transmission route from the route including the geared transmission 20 to the route including the continuously variable transmission 20 when it is required to reduce the total speed ratio $\gamma_4$ to be lower than the maximum variable ratio $\gamma_{1max}$ of the continuously variable transmission 7, or when it is required to reduce the speed $N_{in}$ of the input shaft 4 (or the engine speed $N_e$ or the turbine speed $N_t$) to be lower than that changed by the total speed ratio $\gamma_4$. When the command signal is transmitted, first of all, the clutch-to-clutch shifting from the first clutch device C1 to the second clutch device C2 is carried out. The electronic control unit may also be configured to transmit the command signal for switching the transmission route when the vehicle speed V or the speed $N_{out}$ of the output shaft 8 reaches a predetermined level during propulsion of the vehicle in the forward direction by transmitting torque through the route including the geared transmission 20.

The switching control of the transmission route is commenced at point t2 shown in FIG. 2, that is, the clutch-to-clutch shifting is commenced at point t2. In this situation, the variable ratio $\gamma_1$ of the continuously variable transmission 7 is increased almost to the maximum variable ratio $\gamma_{1max}$, and the engagement pressure $P_{C1}$ applied to the first clutch device C1 in complete engagement is gradually lowered while gradually increasing the engagement pressure $P_{C2}$ applied to the second clutch device C2 in complete disengagement. Consequently, both the first clutch device C1 and the second clutch device C2 start slipping so that the torque transmitting capacity of the first clutch device C1 starts reducing with the reduction in the engagement pressure $P_{C1}$ applied thereto, and the torque transmitting capacity of the second clutch device C2 starts increasing with the rise in the engagement pressure $P_{C2}$ applied thereto from zero. Optionally, in the initial phase of the clutch-to-clutch shifting, the engagement pressure $P_{C2}$ applied to the second clutch device C2 may also be raised while maintaining the engagement pressure $P_{C1}$ to maintain the first clutch device C1 into complete engagement.

The electronic control unit is further configured to determine a target torque transmitting capacity of the second clutch device C2 when bringing the disengaged second clutch device C2 into engagement, and to transmit a command signal to achieve the determined target torque transmitting capacity. For example, the electronic control unit is configured to determine a target torque transmitting capacity of the second clutch device C2 based on "an input torque taking account of an inertia torque of an input member of the second clutch device C2". That is, the target torque transmitting capacity of the second clutch device C2 is corrected taking account of the inertia torque. Specifically, the electronic control unit is configured to transmit the command signal to achieve a target engagement pressure based on the target torque transmitting capacity to a linear solenoid valve connected to a hydraulic chamber of the second clutch device C2.

At point t3, the engagement pressure $P_{C1}$ applied to the first clutch device C1 is reduced to zero, and the engagement pressure $P_{C2}$ applied to the second clutch device C2 is raised to a predetermined pressure level. For example, the predetermined pressure level includes a level at which a desired torque transmitting capacity of the second clutch device C2 is achieved, and a level at which the engagement pressure $P_{C2}$ applied to the second clutch device C2 starts being increased by a not shown accumulator. Thus, at point t3, the first clutch device C1 is brought into disengagement and the torque transmitting capacity of the second clutch device C2 is increased to the predetermined value so that an inertia phase of the clutch-to-clutch shifting is commenced. Since an inertial force of the engine 1 is smaller than that of the vehicle 1, the engine speed $N_e$ is reduced during the inertia phase and consequently the rotational speed $N_{in}$ of the input shaft 4 is reduced. For this reason, when the inertia phase is commenced, the total speed ratio $\gamma_4$ between the rotational speed $N_{in}$ of the input shaft 4 and the rotational speed $N_{out}$ of the output shaft 8 starts decreasing. As a result of such reduction in the rotational speed $N_{in}$ of the input shaft 4 while maintaining the variable ratio $\gamma_1$ of the continuously variable transmission 7 to the maximum variable ratio $\gamma_{1max}$, the rotational speed $N_{p2}$ of the secondary pulley 40 is lowered.

The electronic control unit is further configured to transmit a command signal for starting a speed change operation of the continuously variable transmission 7 during execution of the clutch-to-clutch shifting to reduce the variable ratio $\gamma_1$ of the continuously variable transmission 7 by narrowing the groove width of the primary pulley 30. Specifically, the electronic control unit transmits the command signal for starting a speed change operation at a timing between the commencement and completion of the clutch-to-clutch shifting. For example, the electronic control unit transmits the command signal for starting a speed change operation when a difference between the total speed ratio $\gamma_4$ and the maximum variable ratio $\gamma_{1max}$ of the continuously variable transmission 7 becomes smaller than a predetermined value, or when a difference between the rotational speed $N_{p2}$ of the secondary pulley 40 and the rotational speed $N_{out}$ of the output shaft 8 becomes smaller than a predetermined value. Instead, the electronic control unit may also be configured to transmit the command signal for starting a speed change operation when a difference between the current engagement pressure $P_{C2}$ applied to the second clutch device C2 and the engagement pressure $P_{C2}$ to bring the second clutch device C2 into complete engagement becomes smaller than a predetermined value. Further, the electronic control unit may also be configured to transmit the command signal for starting a speed change operation when a difference between the current torque transmitting capacity of the second clutch device C2 and the torque transmitting capacity of the second clutch device C2 in complete engagement becomes smaller than a predetermined value. That is, the continuously variable transmission 7 is controlled to start a speed change operation before completion of the clutch-to-clutch shifting, and the speed change operation of the continuously variable transmission 7 is preferably started at a timing just before the completion of the clutch-to-clutch shifting. In this situation, specifically, the electronic control unit transmits a command signal for actuating the actuator 33 to change the belt groove of the primary pulley 30 electrically or hydraulically.

As can be seen from FIG. 2, the speed change operation of the continuously variable transmission 7 is commenced at point t4 so that the variable ratio $\gamma_1$ of the continuously variable transmission 7 starts reducing. Here, an actual variable ratio $\gamma_1$ of the continuously variable transmission 7 is changed toward the target ratio at a greater rate (i.e., at a faster speed) in the beginning of speed change operation of the continuously variable transmission 7. For example, if the variable ratio $\gamma_1$ of the continuously variable transmission 7 is increased to the maximum variable ratio $\gamma_{1max}$, the variable ratio $\gamma_1$ is reduced toward the target ratio abruptly immediately after the commencement of the speed change operation, and then reduced mildly to achieve the target ratio.

After the commencement of the speed change operation of the continuously variable transmission 7, the electronic control unit carries out a synchronization control of a speed change rate of the continuously variable transmission 7 to a shifting rate of the clutch-to-clutch shifting when the second clutch device C2 is brought into engagement completely. In other words, the electronic control unit carries out a synchronization of a change rate of the total speed ratio $\gamma_4$ with a change rate of the variable ratio $\gamma_1$ of the continuously variable transmission 7. To this end, the electronic control unit detects the change rate of the variable ratio $\gamma_1$ of the continuously variable transmission 7 by detecting a groove width of the primary pulley 30, and transmits a command signal to change the engagement pressure $P_{C2}$ applied to the second clutch device C2 in accordance with the detected change rate of the variable ratio $\gamma_1$. Otherwise, if the actuator 33 is an electric actuator, the electronic control unit transmits a command signal to the actuator 33 based on the detected change rate of the variable ratio $\gamma_1$, and changes the engagement pressure $P_{C2}$ applied to the second clutch device C2 in such a manner that a change rate of the total speed ratio $\gamma_4$ is equalized to that of the variable ratio $\gamma_1$. By contrast, if the actuator 33 is a hydraulic actuator, it is also possible to transmit the command signal from the electronic control unit to the hydraulic circuit based on the detected change rate of the variable ratio $\gamma_1$.

As can be seen from FIG. 2, the change rate of the total speed ratio $\gamma_4$ is synchronized with the change rate of the variable ratio $\gamma_1$ of the continuously variable transmission 7 between point t4 and point t5. As a result of thus synchronizing the change rate of the total speed ratio $\gamma_4$ with the change rate of the variable ratio $\gamma_1$ of the continuously variable transmission 7, a speed change operation of the speed change unit can be smoothened. Specifically, in case of delivering torque from the input shaft 4 to the output shaft 8 through the route including the continuously variable transmission 7, the total speed ratio $\gamma_4$ of the speed change unit is governed by the variable ratio $\gamma_1$ of the continuously variable transmission 7. In this case, therefore, the speed change operation of the speed change unit can be carried out smoothly by thus equalizing the change rate of the total speed ratio $\gamma_4$ with the change rate of the variable ratio $\gamma_1$ of the continuously variable transmission 7 when shifting the transmission route from the route including the geared transmission 20 to the route including the continuously variable transmission 7.

To this end, the electronic control unit determines a synchronization between the rotational speed $N_{p2}$ of the secondary pulley 40 and the rotational speed $N_{out}$ of the output shaft 8. Since a synchronous speed between those members is changed depending on the situation of the speed change operation of the continuously variable transmission 7, the electronic control unit is further configured to determine a synchronization between the rotational speed of those members while observing the situation of the speed change operation of the continuously variable transmission 7 and updating a synchronization judging speed of the second clutch C2. That is, the rotational speed $N_{p2}$ of the secondary pulley 40 is changed with a change in the variable ratio $\gamma_1$, and hence the electronic control unit observes the situation of the speed change operation of the continuously variable transmission 7 by detecting a speed change rate of the continuously variable transmission 7 or a change rate of the rotational speed $N_{p2}$. Based on the obtained speed change rate of the continuously variable transmission 7 or a change rate of the rotational speed $N_{p2}$, the electronic control unit calculates the synchronization judging speed of the second clutch C2. When a synchronization of the rotational speed $N_{p2}$ of the secondary pulley 40 with the rotational speed $N_{out}$ of the output shaft 8 is determined, the electronic control unit terminates the switching control of the transmission route.

As shown in FIG. 2, the engagement pressure $P_{C2}$ is raised to a level to bring the second clutch device C2 into complete engagement at point t5 so that the rotational speed $N_{p2}$ of the secondary pulley 40 is synchronized with the rotational speed $N_{out}$ of the output shaft 8. As a result, the switching control of the transmission route, that is, the clutch-to-clutch shifting is completed.

When the switching control of the transmission route is completed, both the brake device 5 and the first clutch device C1 are brought into disengagement so that the torque reversing device 5 is allowed to rotate freely, and hence the input shaft 4 is disconnected from the geared transmission 20. However, the secondary pulley 40 is connected to the output shaft 8 through the second clutch device C2 so that the input shaft 4 is connected to the output shaft 8 in such a manner to transmit torque through the continuously variable transmission 7. In the second mode, therefore, a speed of the engine 1 can be adjusted in an optimum fuel efficient manner by gradually reducing a speed ratio of the continuously variable transmission 7 in accordance with a vehicle speed and an opening degree of the accelerator. In case of thus transmitting torque through the route including the continuously variable transmission 7, the total speed ratio $\gamma_4$ of the speed change unit is determined by multiplying the ratio $\gamma_3$ of the torque reversing device 5 as the planetary gear unit by the variable ratio $\gamma_1$ of the continuously variable transmission 7. However, the sun gear 5s as an input element of the torque reversing device 5 is rotated at the same speed as the primary pulley 30 so that the ratio $\gamma_3$ thereof is set to 1. In this situation, therefore, the total speed ratio $\gamma_4$ of the speed change unit is governed by the variable ratio $\gamma_1$ of the continuously variable transmission 7.

After the first clutch device C1 is brought into disengagement and the second clutch device C2 is brought into engagement so that the torque transmission through the continuously variable transmission 7 is stabilized, the third clutch device C3 is brought into disengagement to disconnect the geared transmission 20 from the output shaft 8. Consequently, torque is delivered from the input shaft 4 to the sun gear 5s of the torque reversing device 5. In this situation, since the ring gear 5r and the carrier 5c are allowed to rotate freely, the torque reversing device 5 is rotated entirely integrally so that speed differences among the rotary elements thereof are reduced. For this reason, a power loss, a damage, noises and vibrations of the torque reversing device 5 can be reduced. In addition, when the third clutch device C3 is brought into disengagement, the first clutch device C1 has already been brought into disengagement and hence torque is not applied to the geared transmission 20. In this situation, therefore, the third clutch device C3 is allowed to be brought into disengagement even if it is a dog clutch. In other words, the dog clutch may be used to serve as the third clutch device C3.

By contrast, in case of propelling the vehicle in the backward direction, both the first clutch device C1 and the second clutch device C2 are brought into disengagement while bringing the third clutch device C3 into engagement. In this case, in the torque reversing device 5, torque of the engine 1 is applied to the sun gear 5s while halting the ring gear 5r by the brake device B so that the carrier 5c is rotated in the opposite direction to the sun gear 5s. Consequently, as the case of propelling the vehicle in the forward direction, torque is delivered from the input shaft 4 to the output shaft 8 through the geared transmission 20, in the direction to propel the vehicle in the backward direction. In this case, the total speed ratio $\gamma_4$ of the speed change unit is determined by multiplying the fixed ratio $\gamma_2$ of the geared transmission 20 by the ratio $\gamma_3$ of the torque reversing device 5 as the planetary gear unit. The torque is further delivered to the drive wheels from the output gear 9 through the reduction gear unit 10 and the front differential 12.

In case of decelerating the vehicle while bringing the first clutch device C1 and the third clutch device C3 into engagement, inertia torque of the vehicle would be applied to the output shaft 8. However, since the second clutch device C2 is brought into disengagement so that the output shaft 8 is disconnected from the secondary pulley 40. In this situation, therefore, a reverse torque resulting from decelerating the vehicle will not be applied to the continuously variable transmission 7. For this reason, the continuously variable transmission 7 can be prevented from being subjected to the unnecessary torque and rotated unnecessarily so that damage of the continuously variable transmission 7 can be reduced. In addition, since the second clutch device C2 is in disengagement to disconnect the output shaft 8 from the continuously variable transmission 7, an interlocking of the transmission can be prevented.

As described, the vehicle control system according to the present invention is configured to start a shifting operation of the geared transmission just before the completion of clutch-to-clutch shifting to switch the transmission route from the route including the geared transmission to the route including the continuously variable transmission. Therefore, the speed change operation can be carried out smoothly while reducing the inertia torque. Specifically, during the switching control of the transmission route, the clutch-to-clutch shifting is started first, and then the shifting operation of the geared transmission is started. Therefore, the total speed ratio can be changed promptly to the target ratio without delay so that speed change response can be improved. In addition, since the shift shock can be reduced without increasing a required time for the clutch-to-clutch shifting, damage of a friction material of the friction clutch can be reduced to elongate lifetime thereof.

According to the present invention, moreover, the engagement devices having a common structure such as the friction clutch and the dog clutch can be used as the clutch devices to simplify the structure of the speed change unit including the geared transmission and the continuously variable transmission. Therefore, the speed change unit can be downsized.

In the speed change unit according to the present invention, both a belt-driven continuously variable transmission and a toroidal continuously variable transmission may be used as the claimed continuously variable transmission. Specifically, the belt-driven continuously variable transmission is especially suitable for an FF layout (i.e., front-engine front-wheel drive layout) vehicle, and the toroidal continuously variable transmission is especially suitable for an FR layout (i.e., front-engine rear-wheel drive layout) vehicle.

The speed change unit according to the present invention should not be limited to the foregoing preferred example, and may be modified within the spirit of the present invention.

For example, a single pinion planetary gear unit may also be employed as the torque reversing device instead of the above-explained double pinion planetary gear unit. In case of using the single pinion planetary gear unit as the torque reversing device, specifically, the sun gear 5s is fitted onto the input shaft 4 while being allowed to rotate relatively therewith to serve as an output element, the carrier 5c is connected to the brake device B to serve as the reaction element, and the ring gear 5r is connected to the drive gear 21 to serve as the input element. In this case, the input shaft 4 is connected to the ring gear 5r, and the sun gear 5s is connected to the ring gear 5r by the first clutch device C1 to be rotated integrally.

Moreover, in order to rotate the torque reversing device integrally, the first clutch device C1 may also be adapted to connect the sun gear, the carrier and the ring gear to one another, instead of connecting the sun gear to the carrier as in the foregoing example.

Further, any kind of dog clutches such as a key-type synchromesh mechanism, a corn-type synchromesh mechanism, a single corn-type synchromesh mechanism, a multi corn-type synchromesh mechanism etc. may be used as the third clutch device C3.

Furthermore, the geared transmission may be adapted not only to establish one fixed gear stage (i.e., a gear ratio or a reduction ratio) but also to shift a gear stage among a plurality of fixed stages (i.e., a gear ratio or a reduction ratio). As described, the geared transmission is disposed to deliver torque of the input shaft to the output shaft with a speed ratio which cannot be established by the continuously variable transmission. To this end, any kind of gear unit having a gear pair whose gear ratio is larger than the maximum speed ratio of the continuously variable transmission may be used as the geared transmission.

REFERENCE SIGNS LIST

1: prime mover; 2: output shaft (crank shaft); 4: input shaft; 5: torque reversing device; $5s$: sun gear; $5r$: ring gear; $5P_1$: first pinion gear; $5P_1$: second pinion gear; $5c$: carrier; 6: primary shaft; 7: continuously variable transmission; $7a$: belt; 8: output shaft; 9: output gear; 10: reduction gear unit; 12: front differential; 13: drive shaft; 20: geared transmission; 21: drive gear; 22: counter driven gear; 23: counter shaft; 24: counter drive gear; 25: driven gear; 30: primary pulley; 40: secondary pulley; 41: fixed sheave; 42: movable sheave; 43: actuator; 44: secondary shaft; B: brake device; C1: first clutch device (friction clutch); C2: second clutch device (friction clutch); C3: third clutch device (dog clutch).

The invention claimed is:

1. A vehicle control system, comprising:
   a continuously variable transmission having a pair of pulleys for changing a speed ratio continuously that is disposed between an input shaft to which torque of a prime mover is applied and an output shaft;
   a geared transmission that is disposed parallel to the continuously variable transmission, and that is adapted to establish a speed ratio that is larger than a maximum speed ratio established by the continuously variable transmission; and
   a friction clutch that is brought into engagement to switch a torque transmission route from a route including the geared transmission to a route including the continuously variable transmission;
   wherein the vehicle control system is configured to:
      start reducing a speed ratio of the continuously variable transmission before the friction clutch is brought into engagement completely when switching the torque transmission route from the route including the geared transmission to the route including the continuously variable transmission while increasing a rotational speed of the output shaft; and
      complete an engagement of the friction clutch while equalizing a change rate of a speed ratio between a rotational speed of the input shaft and the rotational speed of the output shaft with a change rate of a speed ratio of the continuously variable transmission.

2. The vehicle control system as claimed in claim 1, wherein the vehicle control system is configured to complete an engagement of the friction clutch while changing the speed ratio of the continuously variable transmission continuously.

3. The vehicle control system as claimed in claim 1, wherein the vehicle control system is configured to start reducing the speed ratio of the continuously variable transmission when a torque transmitting capacity of the friction clutch is larger than a predetermined value.

4. The vehicle control system as claimed in claim 1, wherein the vehicle control system is configured to start reducing the speed ratio of the continuously variable transmission when a difference between the rotational speed of the output shaft and a rotational speed of the continuously variable transmission is smaller than a predetermined value.

5. The vehicle control system as claimed in claim 1, wherein:
   the friction clutch comprises a hydraulic actuator, and
   the vehicle control system is configured to start reducing the ratio operation of the continuously variable transmission when a hydraulic pressure applied to the friction clutch is raised to be higher than a predetermined level.

6. The vehicle control system as claimed in claim 1, further comprising:
   a first clutch adapted to connect and disconnect the input shaft to/from the geared transmission; and
   a second clutch adapted to connect and disconnect the continuously variable transmission to/from the output shaft;
   wherein the vehicle control system is further configured to
   bring the first clutch into engagement while bringing the second clutch into disengagement while propelling the vehicle by delivering torque through the route including the geared transmission,
   bring the first clutch into disengagement while bringing the second clutch into engagement while propelling the vehicle by delivering torque through the route including the continuously variable transmission, and
   start reducing the speed ratio of the continuously variable transmission before the second clutch is brought into engagement completely while switching the torque transmission route.

7. A control method for a vehicle comprising:
   a continuously variable transmission having a pair of pulleys for changing a speed ratio continuously that is disposed between an input shaft to which torque of a prime mover is applied and an output shaft;
   a geared transmission that is disposed parallel to the continuously variable transmission, and that is adapted to establish a speed ratio that cannot be established by the continuously variable transmission; and
   a friction clutch that is brought into engagement to switch a torque transmission route from a route including the geared transmission to a route including the continuously variable transmission;
   the method comprising:
   starting reduction of a speed ratio of the continuously variable transmission while a torque transmitting capacity of the friction clutch is being increased, when switching the torque transmission route from the route including the geared transmission to the route including the continuously variable transmission while increasing a rotational speed of the output shaft;
   thereafter completing an engagement of the friction clutch while equalizing a change rate of a speed ratio between a rotational speed of the input shaft and the rotational speed of the output shaft with a change rate of a speed ratio of the continuously variable transmission.

8. The control method for a vehicle as claimed in claim 7, further comprising:
   completing the engagement of the friction clutch while changing the speed ratio of the continuously variable transmission continuously.

9. The control method for a vehicle as claimed in claim 7, further comprising:
   starting reduction of the speed ratio of the continuously variable transmission when a torque transmitting capacity of the friction clutch is larger than a predetermined value.

10. The control method for a vehicle as claimed in claim 7, further comprising:

starting reduction of the speed ratio of the continuously variable transmission when a difference between the rotational speed of the output shaft and a rotational speed of the continuously variable transmission is smaller than a predetermined value.

11. The control method for a vehicle as claimed in claim 7, wherein the friction clutch comprises a hydraulic actuator, and the control method further comprising starting reduction of the speed ratio of the continuously variable transmission when a hydraulic pressure applied to the friction clutch is raised to be higher than a predetermined level.

12. The control method for a vehicle as claimed in claim 7, wherein the friction clutch includes a first clutch adapted to connect and disconnect the input shaft to/from the geared transmission, and a second clutch adapted to connect and disconnect the continuously variable transmission to/from the output shaft, and the control method further comprising:

bringing the first clutch into engagement while bringing the second clutch into disengagement while propelling the vehicle by delivering torque through the route including the geared transmission;

bringing the first clutch into disengagement while bringing the second clutch into engagement while propelling the vehicle by delivering torque through the route including the continuously variable transmission; and starting reduction of the speed ratio of the continuously variable transmission before the second clutch is brought into engagement completely while switching the torque transmission route.

\* \* \* \* \*